United States Patent
Morgan et al.

(10) Patent No.: US 8,966,443 B2
(45) Date of Patent: Feb. 24, 2015

(54) METHOD OF BYPASSING AN AUTOSAR SOFTWARE COMPONENT OF AN AUTOSAR SOFTWARE SYSTEM

(75) Inventors: Gary Morgan, York (GB); Nigel Tracey, York (GB); Stuart Mitchel, York (GB); James Dickie, York (GB); Mark Rutter, York (GB)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 13/331,956

(22) Filed: Dec. 20, 2011

(65) Prior Publication Data
US 2012/0159436 A1    Jun. 21, 2012

(30) Foreign Application Priority Data
Dec. 21, 2010 (EP) ................................. 10196134

(51) Int. Cl.
*G06F 9/44* (2006.01)
*G06F 9/445* (2006.01)

(52) U.S. Cl.
CPC .................................. *G06F 9/44521* (2013.01)
USPC ........................................................ 717/120

(58) Field of Classification Search
None
See application file for complete search history.

(56) References Cited

U.S. PATENT DOCUMENTS

| 2005/0125214 A1* | 6/2005 | Yamada et al. | 703/28 |
| 2010/0192164 A1* | 7/2010 | Golm et al. | 719/319 |
| 2011/0022809 A1* | 1/2011 | Satoh et al. | 711/155 |

FOREIGN PATENT DOCUMENTS

| DE | 102006033182 A1 | * | 1/2008 |
| WO | WO 2008138770 A1 | * | 11/2008 |
| WO | WO 2009/013055 | | 1/2009 |
| WO | WO 2009013055 A2 | * | 1/2009 |

OTHER PUBLICATIONS

"Development of AUTOSAR Software Components within Model-Based Design", Copyright © 2008 The MathWorks, Inc.*
"Autosar", Wikipedia, the free encyclopedia, XP002628566, Nov. 14, 2010, pp. 1-6.
"Shim (computing)", Wikipedia, the free encyclopedia, XP002628567, Nov. 30, 2010, pp. 1-2.

* cited by examiner

*Primary Examiner* — Don Wong
*Assistant Examiner* — Daxin Wu
(74) *Attorney, Agent, or Firm* — Kenyon & Kenyon LLP

(57) ABSTRACT

A method of bypassing an AUTOSAR software component of an AUTOSAR software system including two or more AUTOSAR software components connected via a runtime environment (RTE). To get a high flexibility and a close relationship to the AUTOSAR model of development an custom AUTOSAR software component is used to bypass all or part of the functionality of a selected AUTOSAR software component and provide that functionality to another AUTOSAR software component candidate or on some external system.

8 Claims, 2 Drawing Sheets

METHOD OF BYPASSING AN AUTOSAR SOFTWARE COMPONENT OF AN AUTOSAR SOFTWARE SYSTEM

FIELD OF THE INVENTION

The present invention relates to a method of bypassing an AUTOSAR software component of an AUTOSAR software system including two or more AUTOSAR software components connected via a runtime environment.

BACKGROUND INFORMATION

The AUTOSAR system has a concept of software components that embody a piece of application functionality. The software components have ports that carry events and data to and from each software component. A piece of software called a runtime environment (RTE) connects the ports of the software components together so that software components can communicate with each other. Therefore, the software components only know about its working environment from the interaction they have with each other over these ports. FIG. 1 shows two software components C1, C2 communicating in an AUTOSAR system via the runtime environment (RTE).

The development of AUTOSAR software components includes three stages: a desktop prototype, rapid prototyping and development on a production electronic control unit (ECU). When developing AUTOSAR software components it may be necessary to bypass all or part of the functionality of a particular software component and provide that functionality elsewhere: either in another software component or on some external system. Existing approaches to bypass a software component are oriented to work with separate and additional communication lines. Therefore, they lack the flexibility and close relationship to the AUTOSAR model of development.

SUMMARY OF THE INVENTION

The problem addressed by the exemplary embodiments and/or exemplary methods of the present invention is to indicate a method of bypassing an AUTOSAR software component in an AUTOSAR software system with a high flexibility and a close relationship to the AUTOSAR model of development.

The problem is solved by using a custom AUTOSAR software component to bypass all or part of the functionality of a selected AUTOSAR software component and provide that functionality to another AUTOSAR software component candidate or via some external system. The customised AUTOSAR software component can be used to provide bypass-like functionality. Selected AUTOSAR software components are bypassed with very little effort in reconfiguration of the software of the system.

In one embodiment the custom AUTOSAR software component switches between software component candidates to substitute the selected AUTOSAR software component via the runtime environment. Use of separate equipment to substitute the selected AUTOSAR software component is not necessary.

Furthermore, the custom AUTOSAR software component is connected to the AUTOSAR software component candidate substituting the selected AUTOSAR software component through an external data line, particularly an external bus. In this way, software components candidates running on a different processor may be used to replace the selected AUTOSAR software component.

In addition, by receiving a command, the custom AUTOSAR software component connects the invariant AUTOSAR software component with a different software component candidate to substitute the selected AUTOSAR software component via the runtime environment. In order to perform the bypass operation the custom AUTOSAR software component is sent a signal that causes it to use a different AUTOSAR software component candidate. Because such an easy embodiment and the nature of AUTOSAR system, the custom AUTOSAR software component and the AUTOSAR software component candidates might run on workstations, rapid prototyping hardware or real electronic control units (ECU) without any additional equipment.

In another aspect of the exemplary embodiments and/or exemplary methods of the present invention, the runtime environment is used to bypass all or part of the functionality of a selected AUTOSAR software component and provide that functionality via another AUTOSAR software component candidate or on some external system. The runtime environment is modified so that it performs the bypass operation without the need for the custom AUTOSAR software component.

Moreover, the bypass runtime environment itself switches between different software component candidates to substitute the selected AUTOSAR software component. The bypass runtime environment is a runtime environment that has been modified to perform bypass. I.e. it is an extension to the existing runtime environment technology. This modification is necessary because the runtime environment is specified as having a static communication matrix so that the entire runtime environment (and possibly most of the AUTOSAR software system) has to be rebuilt if the runtime environment's communication matrix changes. A by-pass runtime environment allows the communication matrix to be changed without rebuilding the runtime environment or other parts of the system.

Particularly, switching software as part of the runtime environment switches from one AUTOSAR software candidate to another. Therefore, the flexibility of the bypass operation during development processes is increased.

Furthermore, the state of the switching software is stored in flash memory software and the flash memory software is part of the bypass runtime environment wherein the selected AUTOSAR software component and the AUTOSAR software component candidates substituting the selected AUTOSAR software component communicate via the bypass runtime environment. In such a reconfigurable static bypass runtime environment the connections to different AUTOSAR software components candidates are fixed and the flash memory contents need to be changed in order to switch from one AUTOSAR software component candidate to another AUTOSAR software component candidate.

Alternatively, the switching software is coded in the runtime environment. In this dynamic case, code in the bypass runtime environment allows the software switching to take place at run-time. Therefore, the selected AUTOSAR software component can be bypassed by separate AUTOSAR software component candidates at run-time. The dynamic bypass RTE's configuration can be changed more rapidly than in the static case.

The exemplary embodiments and/or exemplary methods of the present invention allow different embodiments. Several shall be explained with help of the following figures. The same features are characterized by the same reference numbers.

DETAILED DESCRIPTION

The AUTOSAR system has a concept of software components that embody a piece of application functionality. The software components have ports that carry events and data to and from each software component. A piece of software called runtime environment (RTE) connects the ports of the software components together so that software components can communicate with each other. Therefore, the software components only know about its working environment from the interaction they have over the ports.

Figure 3:
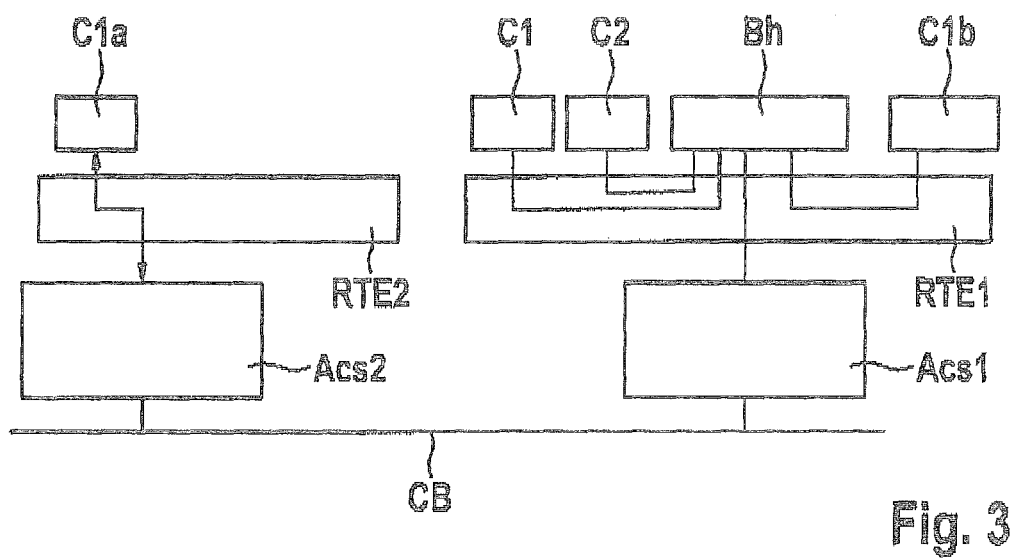
FIG. 3 shows internal and external bypass using a custom AUTOSAR software component as "bypass hook"

FIG. 3 illustrates a custom software component bypass. A custom software component called bypass hook Bh is connected to a first AUTOSAR software component C1 and a second AUTOSAR software component C2 via the first runtime environment RTE1. Furthermore, the bypass hook Bh connects through the first runtime environment RTE1 to a first AUTOSAR software component candidate c1b and a first AUTOSAR communications stack Acs1. The first AUTOSAR communications stack Acs1 is connected with a second AUTOSAR communication stack Acs2 via a communication bus CB such as a CAN, a LIN, or Flexray etc. This second AUTOSAR communications stack Acs2 is coupled with a second AUTOSAR software component candidate C1a via the bypass hardware's runtime environment RTE2.

The bypass hook Bh is a custom AUTOSAR software component that is generated from knowledge of the selected AUTOSAR software component C1 that needs to be bypassed. In the described system AUTOSAR software component C2 communicates with one of the selected software component C1 and the first AUTOSAR software component candidate C1b via the internal runtime environment RTE1 and the second AUTOSAR software component candidate C1a via the communication bus CB. The first AUTOSAR software component candidates C1a runs on a different processor to the selected AUTOSAR software component C1 and the second AUTOSAR software component candidate C1b wherein the selected AUTOSAR software component C1 and the first AUTOSAR software component candidate C1b run on the same processor.

The AUTOSAR software component candidates C1a and C1b are modules intended to substitute selected AUTOSAR software component C1. In order to perform bypass operation the bypass hook Bh is sent a command that causes it to use a different AUTOSAR software component candidate C1a or C1b. Thereby, the first AUTOSAR software component candidates C1b is a candidate that uses internal bypass runtime environment RTE1 and second AUTOSAR software component candidate C1a is a candidate that uses external bypass in the form of communication bus CB.

Because of the nature of AUTOSAR system, the custom AUTOSAR software component in the form of bypass hook Bh and the AUTOSAR software component candidates C1a and C1b might run on workstations, rapid prototyping hardware or real electronic control units (ECU) without any additional equipment.

Figure 4:
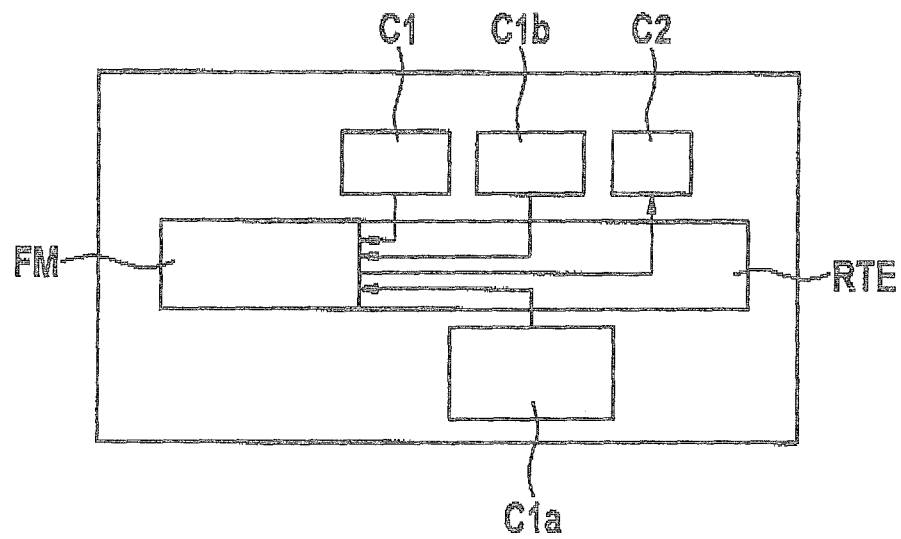
FIG. 4 shows static switching bypass runtime environment.
Figure 5:
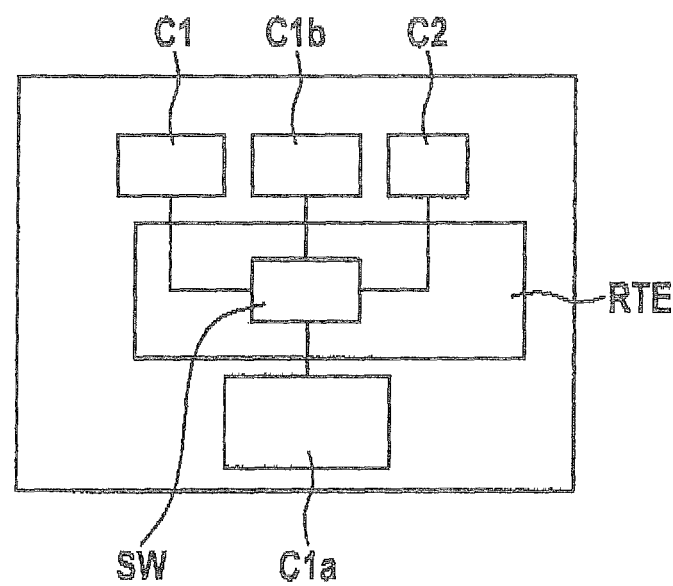
FIG. 5 shows dynamic switching bypass runtime environment.

FIG. 4 and FIG. 5 illustrate a bypass runtime environment without the need for a separate bypass hook Bh. Therefore, the bypass runtime environment is a run-time environment that has been modified to perform bypass. I.e. it is an extension to the existing runtime environment technology. This modification is necessary because the runtime environment is specified as having a static communication matrix so that the entire runtime environment (and possibly most of the AUTOSAR software system) has to be rebuilt if the runtime environment's communication matrix changes. A bypass runtime environment allows the communication matrix to be changed without rebuilding the runtime environment or other parts of the system.

Figure 1:
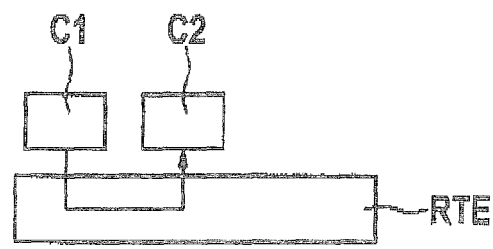
FIG. 1 shows a two-part software component AUTOSAR software system according to the state of the art.
Figure 2:
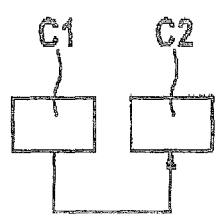
FIG. 2 shows two communicating software modules without AUTOSAR software system according to the state of the art.

The examples shown in FIGS. 4 and 5 are still based upon the two component example shown in FIG. 2. There are two sub-cases of bypass runtime environment—static and dynamic switching. The static switching is depicted in FIG. 4. The AUTOSAR software component candidates C1a and C1b and selected AUTOSAR software component C1 are connected with a flash memory FM, which is part of the bypass runtime environment RTE1. The state of the switch is stored in flash memory FM. Therefore, the flash memory contents need to be changed in order to switch from one AUTOSAR software component candidate C1a or C1b substituting the selected AUTOSAR software component with the AUTOSAR software component candidate C2. In this embodiment the AUTOSAR software component candidate C1a also runs on another processor and consequently is an external module.

The dynamic case of bypass runtime environment RTE is shown in FIG. 5. All components, the selected AUTOSAR software component C1, the AUTOSAR software component candidates C1a and C1b and the external AUTOSAR software component C2 are connected to a switch SW which is part of the bypass runtime environment RTE. The code within the bypass runtime environment RTE allows the switch SW to be modified at run-time. Therefore, the selected AUTOSAR software component C1 can be bypassed either with AUTOSAR software component candidate C1b or with AUTOSAR software component candidate C1a at runtime.

The invention claimed is:

1. A method of bypassing an AUTOSAR software component of an AUTOSAR software system, the method comprising:
    using a custom AUTOSAR software component to bypass at least a part of a functionality of a selected AUTOSAR software component;
    providing the at least a part of the functionality to one of: software component candidates and an external system; and
    connecting the AUTOSAR software component by receiving a command to connect the custom AUTOSAR software component with one of the software component candidates;
    wherein the AUTOSAR system includes at least two AUTOSAR software components connected via a runtime environment (RTE); and
    wherein the custom AUTOSAR software component switches between the software component candidates to substitute the selected AUTOSAR software component via the RTE.

2. The method of claim 1, wherein the custom AUTOSAR software component is generated from the connectivity of the selected AUTOSAR software component to be bypassed.

3. The method of claim 1, further comprising:
substituting the selected AUTOSAR software component through an external data line, which includes an external bus, by connecting the custom AUTOSAR software component to at least one of the software component candidates.

4. The method of claim 1, wherein the runtime environment (RTE) switches between different ones of the software component candidates to substitute the selected AUTOSAR software component.

5. The method of claim 1, wherein the switching software is coded in the RTE.

6. A method of bypassing an AUTOSAR software component of an AUTOSAR software system, the method comprising:
using a runtime environment (RTE) to bypass at least a part of a functionality of a selected AUTOSAR software component;
providing that functionality to one of: software component candidates and an external system; and
connecting the AUTOSAR software component by receiving a command to connect the custom AUTOSAR software component with one of the software component candidates;
wherein the AUTOSAR system includes at least two AUTOSAR software components connected via the RTE; and
wherein the RTE switches between the software component candidates to substitute the selected AUTOSAR software component.

7. The method of claim 6, wherein switching software forms part of the RTE to switch from one of the software component candidates to another one of the software component candidates.

8. The method of claim 6, wherein the RTE includes switching software, and wherein the state of the switching software is stored in a flash memory software and the flash memory software is part of the RTE and the selected AUTOSAR software component and the software component candidates substituting the selected AUTOSAR software component communicate via the RTE.

* * * * *